Feb. 3, 1970 J. L. KULP 3,493,884
PHASE SHIFT SYSTEM INCORPORATING AN INTEGRATOR
Filed June 3, 1968
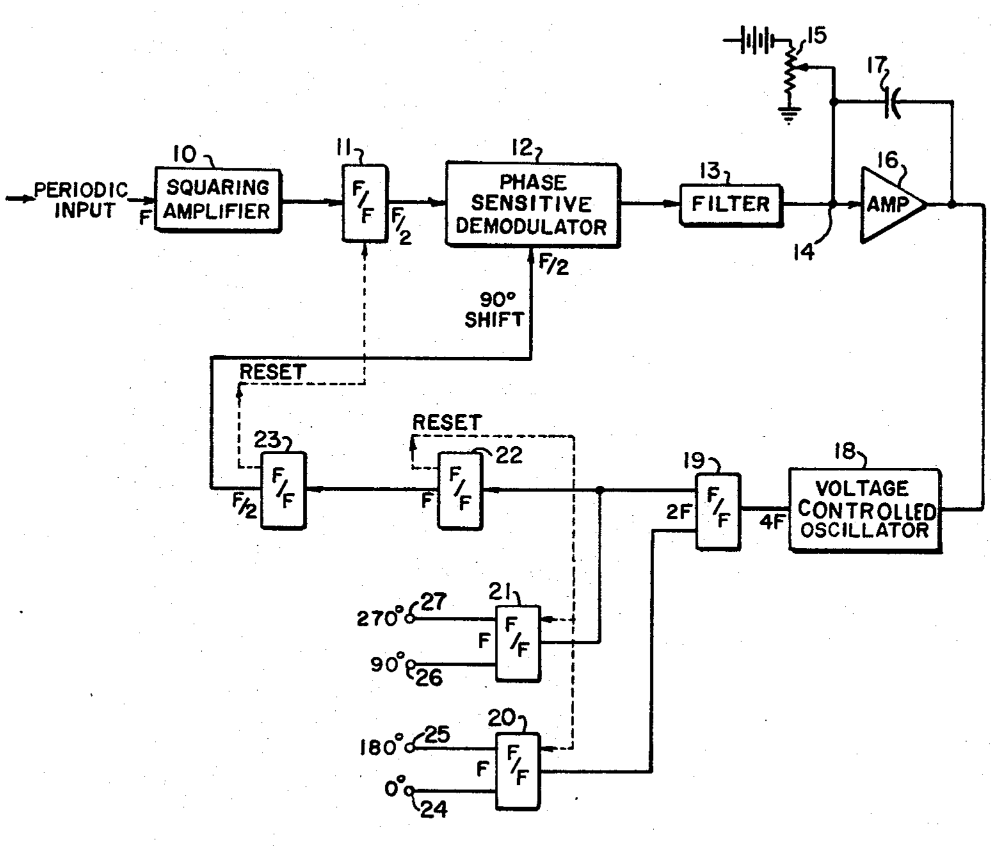
INVENTOR,
JOHN L. KULP.
BY: Harry M. Saragovitz, Edward J. Kelly, Herbert Berl & Julian C. Keppler ATTORNEYS.

United States Patent Office 3,493,884

Patented Feb. 3, 1970

3,493,884
PHASE SHIFT SYSTEM INCORPORATING AN INTEGRATOR

John L. Kulp, Palo Alto, Calif., assignor, by mesne assignments, to the United States of America as represented by the Secretary of the Army

Filed June 3, 1968, Ser. No. 734,032
Int. Cl. H03b *3/04*
U.S. Cl. 331—17 6 Claims

ABSTRACT OF THE DISCLOSURE

This invention relates to a phase-locked loop system capable of producing four exact and invariant quadrature outputs useful as exact references for phase measurements. The system comprises a phase-sensitive demodulator to which a signal periodic input of frequency F is applied through a squaring amplifier and flip-flop. The demodulator, operating at a frequency of $F/2$ produces an error signal which is filtered and applied to the input of a chopper-stabilized operational amplifier integrator, in conjunction with several auxiliary inputs. The integrated sum of these signals controls the frequency of a voltage-controlled oscillator (VCO) followed by several frequency-dividing flip-flops. The final output is fed back at a frequency $F/2$ to the demodulator reference input. Intermediate 180° outputs (from the flip-flop at a frequency of 2F) drive two additional flip-flops to provide the four quadrature outputs at a frequency F, delayed 180° from the input periodic signal F. Currents introduced to the auxiliary inputs can vary or modulate this 180° delay continuously in a linear manner over a range of nearly 90°. Additional flip-flops inserted at the demodulator signal and reference inputs can be used to further reduce the demodulator operating frequency and proportionally increase the maximum output phase deviation and delay which can be produced by the integrator inputs, while retaining the same input and output frequencies. The system is broadband and not dependent on a precise frequency to produce these results, while other systems for producing variable delays are frequency sensitive.

BACKGROUND OF THE INVENTION

This invention relates to a phase-locked loop system for generating four quadrature outputs that are useful in phase measurements although other uses might be found in the phase oscillator and wave generator fields. The device here is a precision, highly accurate and stable phase-locked loop system that is itself a filter producing a substantially noise-free output that drives a series of flip-flops thereby continuously producing quadrature outputs of 0°, 90°, 180°, and 270° relative to an input signal that may randomly vary in frequency from 210–840 c.p.s. The instant invention further relates to a phase-locked loop system producing four quadrature outputs that are capable of continuous linear phase modulation and high deviation through the use of a programmable operational amplifier or integrator.

Various phase generators are known in the art; however, none produce the precision results obtained from the combination of the instant invention. One such device utilizes a series of binary ring counters that has the obvious disadvantage of not being capable of continuous linear phase modulation. Another device employs a number of operational amplifiers in an elaborate loop arrangement; such device is particularly expensive to fabricate and employs an inordinate number of component parts. Various 90° phase shifters have been designed but they are subject to high noise and low signal level requiring amplification. The use of an operational integrator with a true 90° shift has been considered but the high loss inherent in this type of phase standard and the consequent additional noise introduced during reamplification and clipping rendered the excellent accuracy obtainable by this method of little value for the desired application. The inherent amplitude variation with frequency of such a system would also necessitate critical adjustments or some form of AGC. Also, none of the known existing systems is capable of producing broadband delays of up to and *greater than 360°* which are continuously adjustable electronically and can be modulated or varied with precision in a linear manner electronically as in the instant invention.

SUMMARY OF THE INVENTION

An ideal phase-locked loop, comprising an ideal phase-sensitive demodulator, a linear and stable voltage controlled oscillator, and a filter sufficient to remove demodulator full-wave ripple, drives itself to null at the summing junction, the VCO input. There is a precise 90° relationship between the demodulator signal input and reference input to the demodulator from the VCO at one frequency; that for which the VCO requires zero input. At any other frequency, an error voltage would be required from the demodulator to drive the VCO to the new frequency and this would be supplied by a phase shift in the reference input to the demodulator from the VCO relative to the demodulator signal input. In the new condition, an error signal would thus exist at the summing junction and a corresponding error in the 90° shift would occur in order to satisfy the loop equation for lock.

In the system of the instant invention an active integrator, for example, a chopper stabilized operational amplifier with a large feedback-capacitor from output of the amplifier to the summing junction input, is inserted in the loop between the demodulator output or demodulator ripple filter and the VCO input. The summing junction of the integrator then becomes the summing junction of the loop. Since the output of the integrator will respond only to a *change* in the input, a change in frequency will produce a change in the output, shifting the VCO input, but the resulting error signal at the demodulator output will rapidly decay to zero as the new steady-state condition is attained, and a precise 90° difference will again exist between signal input and reference to the demodulator. This is analogous to a servo system with tracking position error where there is a rate-error under dynamic conditions. The integrator thus acts as a memory for the VCO which permits the demodulator output to be driven to a near zero null at each new frequency within the linear range of the phase-locked loop, that is, over the range where no significant reactances complicate the situation and the integrator is nearly ideal. The VCO then drives a novel arrangement of frequency division flip-flops thereby producing exact quadrature outputs of 0°, 90°, 180° and 270°, 180° delayed from input.

Known and predictable linear variations in phase may be accomplished either by the use of a standard voltage driving the integrator summing junction through various precision resistors of known ratio to the affective integrator input resistance coupling it to the filter output, which can be switched, or by use of a precision potentiometer, or by means of known stable or variable voltage sources varied by other means applied to a precision resistor connected to the integrator summing junction, such as various types of transducer outputs or device outputs, DC function generators, etc. Likewise, various reset provisions may be employed to correct errors due to statistical drop-outs in the frequency dividing flip-flops. Likewise, there can be provision made to increase or decrease the programmed deviation possible at the same frequency by increasing the number of flip-flops in the input to the device and in the feedback frequency divider by switching, either mechanically or by electronically programmed relays or switches, in response to various requirements, so as to maintain maximum precision, while satisfying the requirement. Also, as an additional feature, even harmonics and subharmonics of the input signal may be produced which bear a known phase relationship to the input signal and can be precisely varied in phase angle in relation to it.

BRIEF DESCRIPTION OF THE DRAWING

The exact nature of this invention as well as its numerous advantages over the prior art will be apparent from consideration of the following description relating to the annexed drawing in which the figure illustrates an embodiment of the invention in block diagram form.

DESCRIPTION OF THE PREFERRED EMBODIMENT

As shown in the single figure, a carrier impressed periodic input of frequency F is applied to squaring amplifier 10 and through flip-flop 11 dividing the frequency by two and reducing the effects of low frequency noise. Since the output of a flip-flop 11 is inherently symmetrical for any repetitive waveform, the system is made immune to any but very pronounced harmonic distortion in the carrier input, responding only to the period or its submultiple. The principal or main reason for flip-flop 11 is, however, to divide by two the operating frequency of the demodulator, and, consequently to double the maximum phase deviation capability of the system output. The signal then passes through phase sensitive demodulator 12 with a full wave output and thereafter through filter 13 to summing junction 14 where a reference signal may be inserted through a calibrated linear potentiometer 15 to vary the outputs 24–27 thereby giving an adjustable phase delay other than the 90° common to phase-locked loops (180° at the system output). It should be pointed out that such adjustable phase delay may be programmable and is capable of continuous linear modulation. Likewise a fixed summing resistor, or several auxiliary inputs as described above, might be used for the potentiometer 15 to which a varying DC function could be applied thereby giving a phase delay proportional to such DC function. Feedback capacitor 17 is connected to the output of chopper stabilized DC operational amplifier 16 and to summing junction 14. The capacitor 17 may be of any known type such as polystyrene, Teflon, or polycarbonate for low dielectric absorption.

The value of the capacitor 17 is selected to give, in conjunction with the input resistors of the integrator, a time constant sufficient for accurate integration in the desired operating frequency range, and with due consideration to the stability requirements for stable operation of the phase-locked loop under modulation. Connected to the amplifier 16 is the voltage controlled oscillator 18 that produces a signal of four times the input frequency F. Flip-flop 19 is connected to VCO 18 and produces an output signal that is two times the input frequency F. Each of the outputs of flip-flop 19 further feeds divide by two flip-flops 20 and 21 thereby producing four outputs of the same frequency as input signal F delayed 180° relative thereto and of phase relation 0°, 90°, 180° and 270°. Thus, phase delay is accomplished by frequency division through a series of flip-flops 19, 20 and 21 to produce four exact and invariant quadrature outputs. Flip-flops 22 and 23 are connected in series to one of the outputs of flip-flop 20 thereby giving an input signal to the phase sensitive demodulator 12 at $F/2$ which will be maintained at 90° when the loop is locked. Dropped pulses can be provided for by referencing the outputs to the input carrier and using an axis-crossing detector to provide a gating voltage to a reset diode to the gating input of the flip-flops. This will insure that any error will be only a transient of several cycles after which the circuits will resume their initial condition. A simple correction system might consist of a "reset" input to all trigger circuits, connected to a push-button, where the output can be standardized before a measurement.

The demodulator 12 employed had a .001% drift and .01% or better in-phase linearity with a phase linearity with a phase characteristic which is linear to better than 0.1°. The VCO 18 was a unijunction transistor type RC sawtooth oscillator producing a trigger for the flip-flops and approximately 0.1% linearity with drift of the same order. The integrator was a chopper-stabilized vacuum tube operational amplifier with a maximum output voltage of ±100 volts at 5 ma., a DC gain of approximately $10^7$ and a gain of about $10^3$ at 1 kc. The system stability was ±0.1° in phase at any frequency between 210 and 840 c.p.s. The 90° output signal produced varied ±1.0° over this range, at the demodulator reference input, or ±2° at the system output.

Obviously, many modifications and variations of the present invention are possible in light of the above teachings.

What is claimed is:

1. A phase-locked loop system for producing four quadrature outputs comprising:
- a phase sensitive demodulator for receiving a periodic input signal and a reference signal;
- integrator means connected to said demodulator for receiving an error signal therefrom;
- oscillator means connected to said integrator means for producing a variable frequency output;
- a plurality of flip-flops connected to said oscillator means for producing quadrature outputs relative to said periodic input signal; and
- means for providing said reference signal to said phase sensitive demodulator connected in such a manner as to produce a 90° phase shift in said reference signal relative to said periodic input.

2. A phase-locked loop according to claim 1, and further comprising:
- linear phase modulation means connected between said integrator and said phase sensitive demodulator; and
- reset means connected to said flip-flops for correcting errors due to statistical drop-outs.

3. A phase-locked loop system according to claim 2, wherein:
- said linear phase modulation means comprises a standard voltage source connected through a precision potentiometer; and
- said oscillator means is a voltage controlled oscillator.

4. A phase-locked loop system according to claim 3, wherein:
- said integrator comprises a chopper-stabilized operational amplifier with a relatively large feedback capacitor connected thereacross.

5. A phase-locked loop system according to claim 2, wherein:
- said linear phase modulation means comprises a known stable variable voltage source; and
- said oscillator means is a voltage controlled oscillator.

6. A phase-locked loop system according to claim 5, wherein:
- said integrator comprises a chopper-stabilized operational amplifier with a relatively large feedback capacitor connected thereacross.

No references cited.

JOHN KOMINSKI, Primary Examiner

U.S. Cl. X.R.

307—262; 328—24; 331—1, 25, 45, 51